US007544319B2

(12) United States Patent
March et al.

(10) Patent No.: US 7,544,319 B2
(45) Date of Patent: Jun. 9, 2009

(54) VEHICLE HANDLE ASSEMBLY WITH ANTENNA

(75) Inventors: Philip A March, Holland, MI (US); William K Boezwinkle, Grand Haven, MI (US)

(73) Assignee: Donnelly Corporation, Holland, MI (US)

( * ) Notice: Subject to any disclaimer, the term of this patent is extended or adjusted under 35 U.S.C. 154(b) by 574 days.

(21) Appl. No.: 11/311,493

(22) Filed: Dec. 19, 2005

(65) Prior Publication Data

US 2006/0119524 A1 Jun. 8, 2006

Related U.S. Application Data

(62) Division of application No. 10/256,707, filed on Sep. 27, 2002, now Pat. No. 6,977,619.

(60) Provisional application No. 60/326,202, filed on Oct. 1, 2001.

(51) Int. Cl.
*B29C 45/37* (2006.01)
*H01Q 1/32* (2006.01)

(52) U.S. Cl. .................................... 264/328.1; 343/713

(58) Field of Classification Search ......... 343/711–713; 340/5.57, 5.62; 425/130, 572; 264/572, 264/328.1

See application file for complete search history.

(56) References Cited

U.S. PATENT DOCUMENTS 3,667,315 A 6/1972 Polly .......................... 74/51.8
3,737,944 A 6/1973 Szabo et al. .................. 16/430
3,813,729 A 6/1974 Szabo et al. ............... 16/114.1
3,908,149 A 9/1975 Gergoe et al. ........ 292/DIG. 23
4,041,301 A 8/1977 Pelchat ....................... 362/100
4,349,722 A 9/1982 Kurth et al. ................. 219/202
4,471,209 A 9/1984 Hollander ................... 219/204
4,580,822 A 4/1986 Fukumoto .................... 16/266
4,686,741 A 8/1987 Moore et al. .................. 16/438

(Continued)

FOREIGN PATENT DOCUMENTS

DE 3136468 3/1983

(Continued)

OTHER PUBLICATIONS

JP Laying—open gazette No. 1-278835/89, Nov. 1989.

(Continued)

*Primary Examiner*—Hung T Vy
(74) *Attorney, Agent, or Firm*—Van Dyke, Gardner, Linn & Burkhart LLP

(57) ABSTRACT

A method for molding a door handle portion of a door handle assembly for a vehicle includes providing a handle mold for a door handle portion and positioning an antenna within a mold cavity of the handle mold. The method includes providing handle material within the mold cavity and at least partially around the antenna to form the door handle portion and removing the door handle portion and antenna from the handle mold. The handle portion includes an antenna positioned within the handle portion. Optionally, and prior to providing handle material within the mold cavity, the method may comprise providing core material within a mold cavity of a core mold to form a core portion, and positioning the core portion and the antenna within the mold cavity of the handle mold.

19 Claims, 15 Drawing Sheets

U.S. PATENT DOCUMENTS

| | | | | | |
|---|---|---|---|---|---|
| 4,837,892 | A | | 6/1989 | Lo | 16/431 |
| 4,892,342 | A | | 1/1990 | Newman et al. | 292/347 |
| 4,914,779 | A | | 4/1990 | Nakai et al. | 16/412 |
| 5,129,694 | A | | 7/1992 | Taninoto et al. | 292/347 |
| 5,297,010 | A | | 3/1994 | Camarota et al. | 362/501 |
| 5,298,306 | A | | 3/1994 | Miller | 16/430 |
| 5,390,572 | A | * | 2/1995 | Gakhar et al. | 81/436 |
| 5,398,369 | A | | 3/1995 | Heinzelman et al. | 15/143.1 |
| 5,497,641 | A | | 3/1996 | Linde et al. | 70/257 |
| 5,530,989 | A | | 7/1996 | Remert et al. | 16/430 |
| 5,648,788 | A | * | 7/1997 | Bumsted | 343/895 |
| 5,651,163 | A | | 7/1997 | Tamaki | 16/112 |
| 5,682,135 | A | | 10/1997 | Labonde | 340/426 |
| 5,709,453 | A | | 1/1998 | Krent et al. | 362/80 |
| 5,740,586 | A | | 4/1998 | Gomas | 16/430 |
| 5,781,956 | A | | 7/1998 | Kelsay et al. | 15/143.1 |
| 5,781,958 | A | | 7/1998 | Meessmann et al. | 16/431 |
| 5,844,470 | A | | 12/1998 | Garnault et al. | 340/426 |
| 5,857,241 | A | | 1/1999 | Camp et al. | 15/230.11 |
| 5,956,799 | A | * | 9/1999 | Panaccione et al. | 15/236.01 |
| 6,018,841 | A | | 2/2000 | Kelsay et al. | 15/143.1 |
| 6,036,244 | A | | 3/2000 | Tyves et al. | 292/336.3 |
| 6,070,998 | A | | 6/2000 | Jennings et al. | 362/501 |
| 6,075,294 | A | | 6/2000 | Van den Boom et al. | 307/10.1 |
| 6,093,978 | A | | 7/2000 | Benard et al. | 307/10.2 |
| 6,135,621 | A | | 10/2000 | Bach et al. | 362/399 |
| 6,149,287 | A | | 11/2000 | Pastrick et al. | |
| 6,164,805 | A | | 12/2000 | Hulse | 362/501 |
| 6,165,407 | A | * | 12/2000 | Tahara et al. | 264/328.1 |
| 6,180,212 | B1 | | 1/2001 | Single et al. | 16/110.1 |
| 6,218,933 | B1 | | 4/2001 | Josserand et al. | 340/426 |
| 6,234,548 | B1 | | 5/2001 | Mittelbach et al. | |
| 6,239,693 | B1 | | 5/2001 | Benard et al. | 340/426 |
| 6,304,168 | B1 | * | 10/2001 | Ohta et al. | 340/5.72 |
| 6,349,450 | B1 | | 2/2002 | Koops et al. | 16/412 |
| 6,353,415 | B1 | | 3/2002 | Ashtiani et al. | |
| 6,367,295 | B1 | | 4/2002 | Agostini et al. | 70/257 |
| 6,371,747 | B1 | * | 4/2002 | Niina et al. | 425/130 |
| 6,477,464 | B2 | | 11/2002 | McCarthy et al. | |
| 6,556,125 | B1 | | 4/2003 | Rohrl | 340/5.62 |
| 6,577,228 | B1 | * | 6/2003 | Tsuchida et al. | 340/5.72 |
| 6,621,178 | B2 | | 9/2003 | Morillon | 307/10.5 |
| 6,669,267 | B1 | | 12/2003 | Lynam et al. | 296/146.5 |
| 6,700,476 | B1 | | 3/2004 | Okada et al. | 340/5.62 |
| 6,768,413 | B1 | * | 7/2004 | Kemmann et al. | 340/5.72 |
| 6,795,032 | B2 | | 9/2004 | Leda et al. | 343/713 |
| 2001/0026244 | A1 | * | 10/2001 | Ieda et al. | 343/867 |
| 2002/0033777 | A1 | * | 3/2002 | Maruyama et al. | 343/713 |

FOREIGN PATENT DOCUMENTS

| | | |
|---|---|---|
| DE | 4212291 | 10/1993 |
| DE | 19752974 | 9/1998 |
| DE | 29921826 | 4/2000 |
| EP | 0831194 | 3/1998 |
| EP | 1 006 028 A2 | 6/2000 |
| EP | 1026348 | 8/2000 |
| EP | 1 206 002 A2 | 5/2002 |
| GB | 1043210 | 9/1966 |
| GB | 2298748 | 9/1996 |
| JP | 401030895 | 2/1989 |
| JP | 10290726 | 11/1998 |
| JP | 10292702 | 11/1998 |
| JP | 1120529 | 1/1999 |
| JP | 295514 | 10/2001 |
| WO | WO 8807118 | 9/1988 |
| WO | WO 00/44066 | 7/2000 |

OTHER PUBLICATIONS

JP Laying—open gazette No. 1-299966/89, Dec. 1989.
JP Laying—open gazette No. 1-299967/89, Dec. 1989.
Supplemental European Search Report completed Dec. 22, 2004, from corresponding European Application No. EP 02 77 8389.

* cited by examiner

VEHICLE HANDLE ASSEMBLY WITH ANTENNA

CROSS REFERENCE TO RELATED APPLICATIONS

The present application is a divisional application of U.S. patent application Ser. No. 10/256,707, filed Sep. 27, 2002, now U.S. Pat. No. 6,977,619, which claims priority of U.S. provisional application, Ser. No. 60/326,202, filed Oct. 1, 2001 by March et al. for VEHICLE HANDLE ASSEMBLY WITH ANTENNA, which are hereby incorporated herein by reference in their entireties.

FIELD OF THE INVENTION

The present invention relates to door handle assemblies and, more particularly, to door handle assemblies for vehicles.

BACKGROUND OF THE INVENTION

Until recently, door handle assemblies for vehicles have been principally mechanical devices, which require a handle portion, which is coupled to a latching mechanism, to be rotated or pivoted to either latch or unlatch the latching mechanism to open the door of the vehicle. For example, some door handle assemblies include a strap type handle, which pivots about one end of the handle. The pivoting end of the handle is coupled to a latch mechanism, for example by a cable or a linkage, which is actuated by the pivoting of the handle. Other door handle assemblies include a paddle type handle, which is mounted to a pivotable shaft, for example, in a recessed portion of the door, with the shaft being coupled to the latch mechanism, which is actuated by the pivoting of the shaft. Other styles include tailgate assemblies, including T-shaped handles that rotate about their central axis to latch or unlatch the latch mechanism. Typically, these door handle assemblies are fabricated as a unitary assembly and attached to the door. In addition, a key has been typically required to lock or unlock the latching mechanism.

Typically, handle assemblies, such as strap handle assemblies, are constructed to be lightweight, yet strong and durable. The material selected for the handle portion is thus typically an engineering plastic or the like. In order to reduce the amount of material in the handle, so as to reduce the weight and cost of the handle, the handle portion may be a hollow handle. The handle may be hollowed by a gas injection process during molding of the handle, whereby gas is blown into the mold with the plastic material, such that the inner plastic fill material is blown out of the mold through an opening or hole. This creates a cavity within the handle to reduce the amount of material required to form the handle and, thus, the weight of the handle, and to reduce the possibility of sinks or other flaws in the handle which may otherwise occur when a portion of the handle is too thick, since the outer portion may cool faster than the inner portion.

More recently, some vehicles have incorporated electrical components, which provide a key-less locking and/or unlocking device. The locking device may be operable in response to a keypad at the door or a key fob carried by a driver or passenger of the vehicle. Passive entry systems have also been developed that are responsive to approach by a driver of the vehicle (for example, such as disclosed in U.S. Pat. Nos. 6,367,295; 6,075,294; and 6,218,933, the entire disclosures of which are hereby incorporated by reference herein), whereby the system detects a signaling device held or carried by the approaching driver and automatically unlocks the door or doors of the vehicle. Such locking devices and systems function in connection with an antenna placed at the vehicle. The antenna may receive a signal from a remote device and operate a locking system or other system of the vehicle in response to the signal. Such antennas take many forms, such as an antenna formed by wire windings wrapped around a core or former element. The antenna may be any acceptable antenna means and may comprise wire windings or other types of antennas, such as carbon antennas, tracks on a printed circuit board or other substrate material or the like. The antenna includes a connection or terminal, such as a pigtail connection or the like, at an end of the wiring for connection to the device. These antennas are typically placed within the vehicle to detect a signal from any direction around the vehicle. Use of such an antenna allows the locking device to be adapted to permit remote unlocking of the vehicle, which is particularly useful in extreme weather conditions or in low light conditions, especially where safety may be a concern.

SUMMARY OF THE INVENTION

The present invention is intended to provide a vehicle door handle assembly which includes an antenna positioned or molded within a handle portion of the handle assembly and, preferably, integrally molded therein.

According to an aspect of the present invention, a door handle assembly for a door of a vehicle includes a base portion, a handle portion and an antenna. The vehicle door has a latch mechanism and the vehicle includes a door locking system. The base portion is adapted to mount to the door of the vehicle. The handle portion is movably mounted to the base portion and adapted to couple to the latch mechanism of the door, such that movement of the handle portion actuates the latch mechanism. The handle portion is molded at least partially around the antenna. The antenna receives a signal from a remote signaling device and communicates the signal to the door locking system of the vehicle. Preferably, the antenna includes a wire or connector extending therefrom which is partially encapsulated within the handle portion.

In one form, the handle portion is integrally molded at least partially around the antenna. The handle portion may comprise an inner core portion and an outer skin portion, with the outer skin portion molded over the inner core portion. The antenna may be positioned within the inner core portion of the handle portion, with the outer skin portion molded over the antenna and the inner core portion. Optionally, the antenna may be positioned within a cavity formed within the inner core portion of the handle portion. Alternately, the inner core portion may be molded at least partially around the antenna.

According to another aspect of the present invention, a door handle assembly includes a chassis or base portion and a handle portion, which is mounted to the base portion. The vehicle door has a latch mechanism and the vehicle includes a door locking system. The base portion is adapted to mount to the door of the vehicle. The handle portion is movably mounted to the base portion and adapted to couple to the latch mechanism of the door, such that movement of the handle portion actuates the latch mechanism. The handle portion includes a molded shell portion and an antenna at least partially within the shell portion. The shell portion is molded at least partially around the antenna. The antenna receives a signal from a remote signaling device and communicates the signal to the door locking system of the vehicle.

In one form, the handle portion comprises an inner core portion and the shell portion, with the shell portion molded over the inner core portion. The antenna may be positioned within the inner core portion of the handle portion, with the shell portion molded over the antenna and the inner core portion. Optionally, the antenna may be positioned within a cavity formed within the inner core portion of the handle portion, or the inner core portion may be molded at least partially around the antenna, without affecting the scope of the present invention.

The antenna is positioned within the handle portion and communicates the signal to the door locking system via a wire connection or the like, or wirelessly, such as via a radio frequency signal or via an infrared signal or via other wireless signaling means. Such connections can include cables, wires, fiber optic cables or the like. The communication to the locking system may be via a vehicle bus or multiplex system, such as a LIN (Local Interconnect Network) or CAN (Car or Controlled Area Network) system, such as described in U.S. Pat. No. 6,291,905 for VEHICLE REARVIEW MIRROR AND A VEHICLE CONTROL SYSTEM INCORPORATING SUCH MIRROR; U.S. patent application Ser. No. 09/820,013, filed Mar. 28, 2001 by Drummond et al. for DIGITAL ELECTROCHROMIC CIRCUIT WITH A VEHICLE NETWORK, now U.S. Pat. No. 6,396,408; and Ser. No. 09/799,414, filed Mar. 5, 2001 by McCarthy et al. for COMPLETE MIRROR-BASED GLOBAL-POSITIONING SYSTEM (GPS) NAVIGATION SOLUTION, now U.S. Pat. No. 6,477,464, which are all hereby incorporated herein by reference. The vehicle door may then be unlocked as a person carrying the remote signaling device approaches the door handle. Optionally, other systems may be activated in response to the remote signaling device, such as vehicle lighting systems, such as interior lights, security lights (such as disclosed in U.S. Pat. Nos. 6,280,069; 6,276,821; 6,176,602; 6,152,590; 6,149,287; 6,139,172; 6,086,229; 5,938,321; 5,671,996; and 5,497,305; and U.S. patent application Ser. No. 09/866,398, filed May 25, 2001, now U.S. Pat. No. 6,416,208; and Ser. No. 09/690,048, filed Oct. 16, 2000, now U.S. Pat. No. 6,568,839, all of which are hereby incorporated herein by reference), or the like, or the vehicle ignition, or any other desired system, without affecting the scope of the present invention.

In one form, the antenna is placed within a cavity formed within the door handle portion. In another form, the antenna is molded within the door handle portion. In yet another form, the antenna may be encased (such as by molding) within a molded core portion, which is then positioned (and preferably molded) within the handle portion, in order to protect the antenna during the molding process of the outer handle portion and to provide a high quality, class A finish to the handle portion, since the outer portion is overmolded in a thin layer over the core portion, thereby reducing the possibility of sinks and/or blemishes occurring in the outer skin portion.

According to another aspect of the present invention, a method for molding a door handle portion of a vehicle door handle includes providing a handle mold for a door handle portion, positioning an antenna within a mold cavity of the handle mold, and providing handle material within the mold cavity and at least partially around the antenna to form the door handle portion. The door handle portion and antenna are removed from handle mold after the molding process is complete.

In one form, prior to providing handle material within the mold cavity, the method includes providing core material within a mold cavity of a core mold to form a core portion, and positioning the core portion and the antenna in a mold cavity of the handle mold. The method may include positioning the antenna in a cavity of the core portion prior to providing handle material to the mold cavity of the handle mold. Optionally, the antenna may be positioned in the mold cavity of the core mold prior to providing core material to the mold cavity, whereby the step of providing core material comprises providing core material within the mold cavity of the core mold at least partially around the antenna to form a unitary core portion and antenna assembly. Preferably, the core material is provided into the mold cavity via injecting core material into the mold cavity through a gate positioned at or near one end of the core mold, with the antenna positioned at or near the other end of the core mold.

The core material may comprise a different material from the handle material. More particularly, the core material may comprise one of a urethane material, a thermoplastic elastomer, a polyvinylchloride (PVC), a thermoplastic olefin (TPO), a nylon material and a reground nylon material, while the handle material may comprise one of a thermoplastic material and a thermoset material. The core mold cavity and the handle mold cavity may be within a single mold, whereby the core portion and the handle portion are molded via a two shot molding process.

Preferably, the method includes providing an electrical connector to the antenna and positioning the electrical connector within the mold cavity such that an end of the electrical connector extends from the door handle portion after the door handle portion is removed from the mold.

Therefore, the present invention provides a door handle assembly which includes an antenna within a handle portion of the door handle assembly. The antenna may be positioned within an existing cavity of the handle portion or the handle portion may be molded at least partially around the antenna. The antenna may be positioned within an inner, core portion of the handle portion, whereby the outer skin portion of the handle portion is then molded at least partially around the core portion and the antenna. By molding the outer skin portion of the handle in a thin layer, the present invention facilitates production of a high quality surface for the handle, and reduces the possibility of sinks occurring in the outer skin material as it cools. The present invention also provides for a lower cost handle assembly, since less of the skin material, which is typically expensive, is required for the outer skin portion, while still providing a strong and durable door handle with a high quality, Class A surface. The molded door handle substantially encases the antenna and thus substantially precludes exposure of the antenna to the elements, thereby protecting the antenna from damage.

These and other objects, advantages, purposes, and features of the invention will become apparent upon review of the following description in conjunction with the drawings.

DESCRIPTION OF THE PREFERRED EMBODIMENTS

Figure 1:
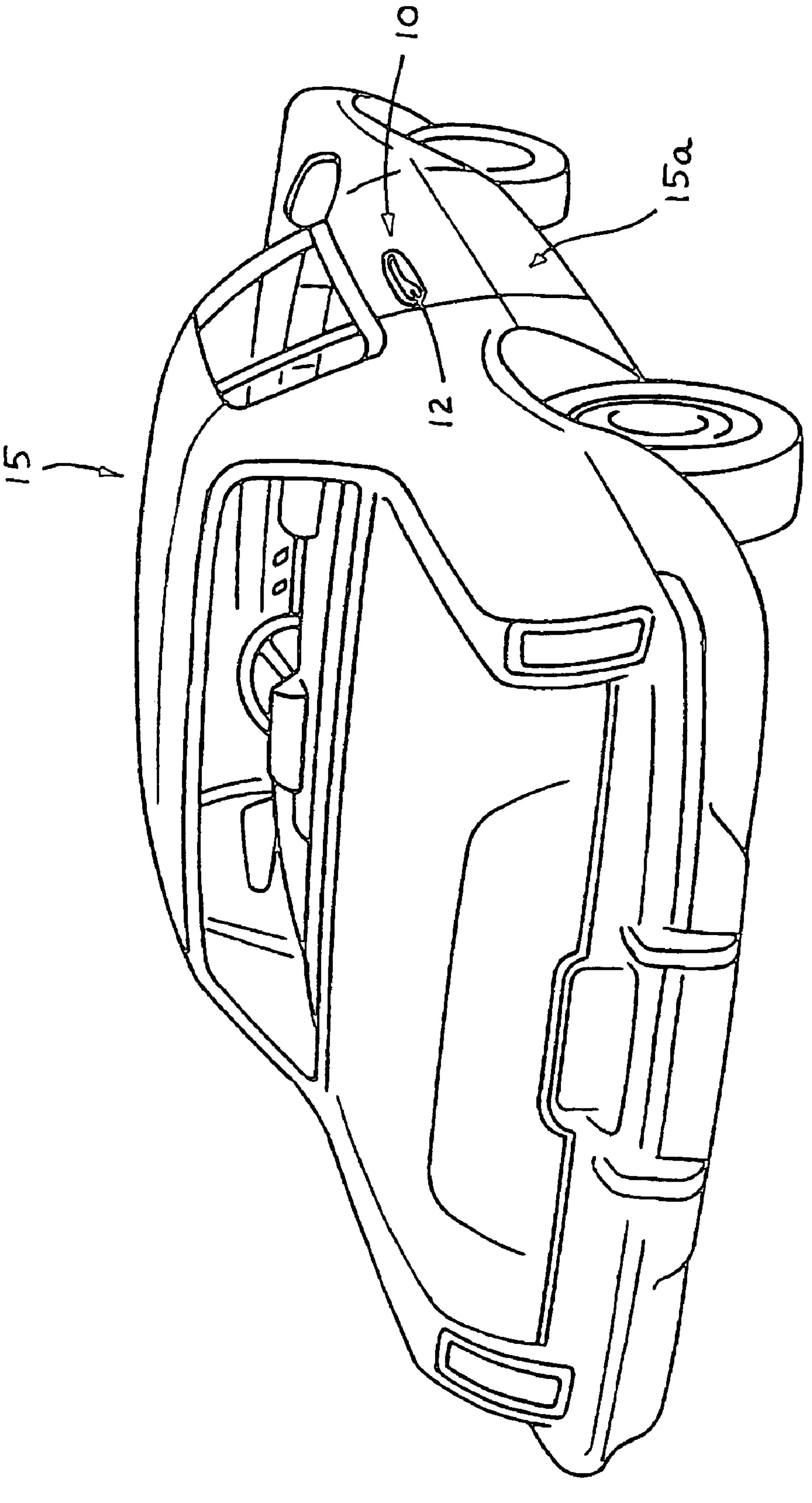
FIG. 1 is a perspective view of a vehicle incorporating an antenna within a door handle in accordance with the present invention.
Figure 2:
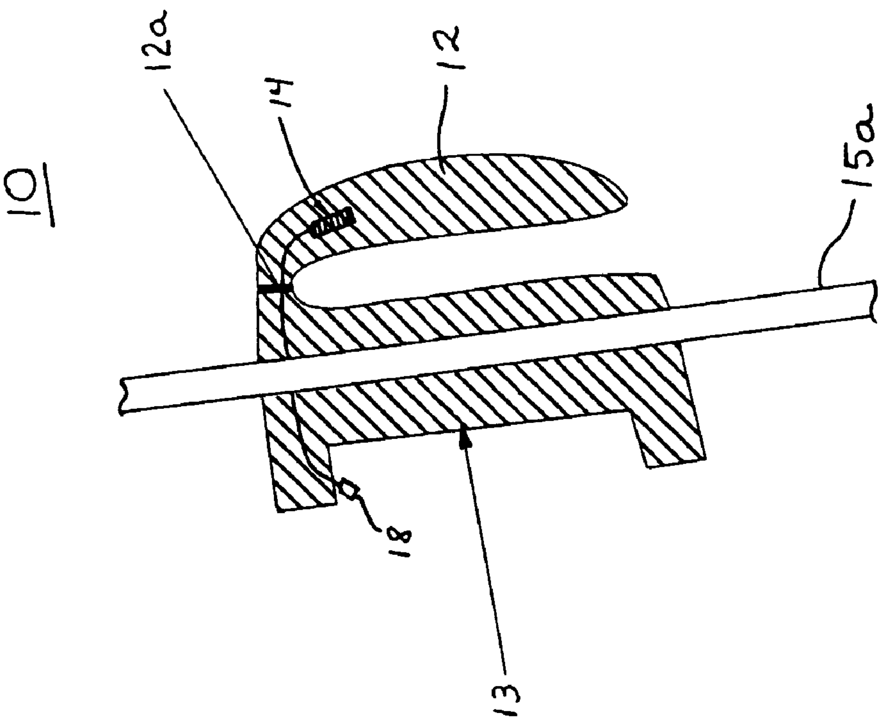
FIG. 2 is a sectional view of the vehicle door handle assembly and antenna as installed at the vehicle door of FIG. 1.

Referring now to the drawings and the illustrative embodiments depicted therein, a vehicle door handle assembly 10 includes a handle portion 12 and a chassis or body portion 13 mounted to a door 15*a* of a vehicle 15 (FIGS. 1 and 2). Handle assembly 10 is adapted to be mounted to a vehicle 15, such as a side door 15*a* of the vehicle, and includes an antenna 14 within handle portion 12. Handle portion 12 is movable, such as pivotable about a hinge or pivot 12*a*, to open the door of the vehicle via a latch mechanism (not shown) of the vehicle door 15*a*. Antenna 14 may be implemented in connection with a keyless or passive entry system or locking system (not shown) and is operable to receive a signal from a remote signaling or transmitting device (not shown) and to communicate the signal to the locking system of the vehicle for locking and/or unlocking the door or doors of the vehicle in response to the signal.

Figure 3:
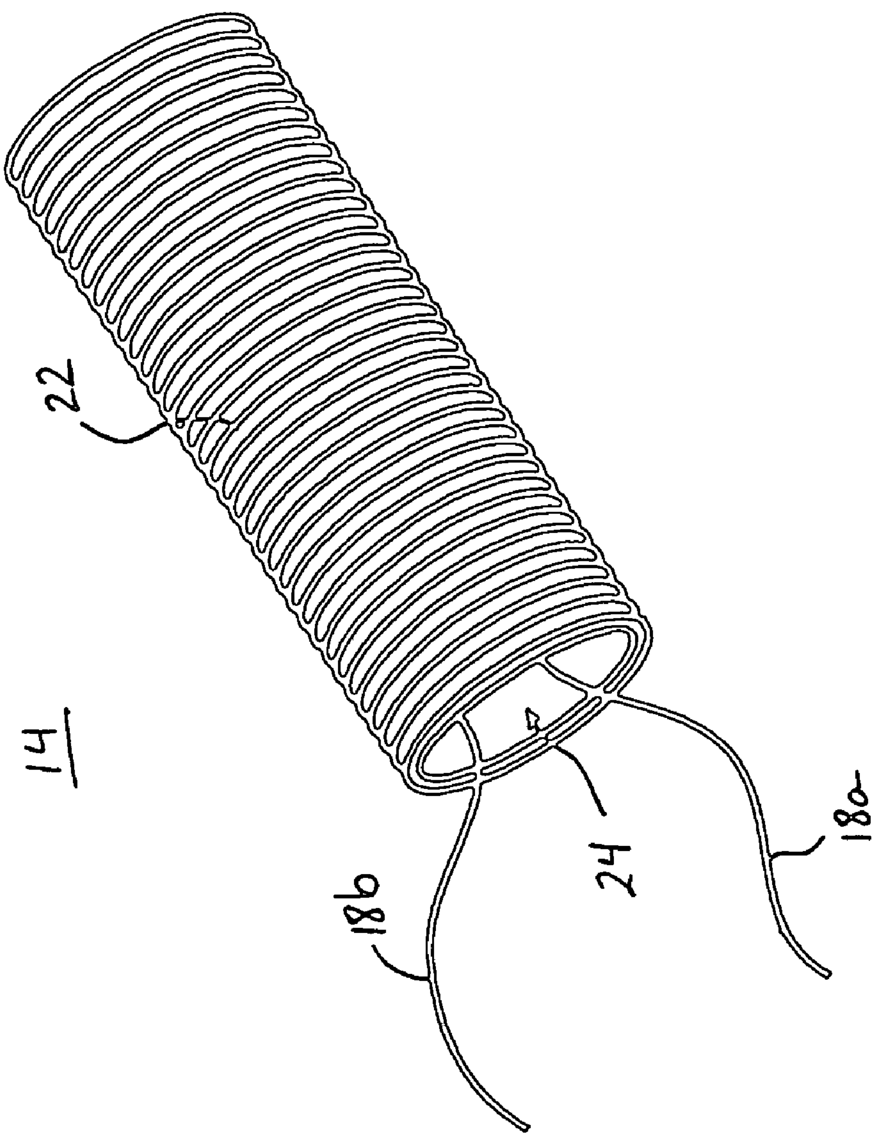
FIG. 3 is a perspective view of a typical antenna suitable for use with a door handle assembly in accordance with the present invention.

Antenna 14 may be any known antenna means or device, such as a coiled wire 22 winding around a bobbin or spool or other former 24, such as the bobbin shown in FIG. 3, without affecting the scope of the present invention. For example, antenna 14 may be a coiled wire antenna of the type manufactured and marketed by Siemens AG of Munich, Germany. Antenna wirings 22 may be wrapped around a spool 24 or the like that is generally in a desired shape for fitting within the handle portion 12. The wire 22 includes a connector, such as a pair of terminals or ends 18*a*, 18*b*, for connecting to the locking system or other electrical accessory or receiver. The connector or ends 18*a*, 18*b* may further include a plug type connector 18 (FIGS. 10-16) for easy connection to a corresponding connector (not shown) of the locking system within the vehicle door or other accessory or system of the vehicle, as discussed below. The signal received by antenna 14 is then communicated to the locking system via terminal wirings 18*a*, 18*b*. Optionally, the antenna may communicate the signal to the locking system via a radio frequency signal or via an infrared signal or via other wireless signaling means, without affecting the scope of the present invention.

In the illustrated embodiments of FIGS. 5 and 9-17, movable handle portion 12 comprises a strap-type handle portion. Handle portion 12 is pivotally mounted on the base portion 13, which is secured to the vehicle door 15. Handle portion 12 is pivotable relative to the base portion about a generally vertical axis at one end of handle portion 12, such that the opposite end of handle portion 12 lifts away from the base portion and the body of the vehicle when pulled, and in turn pulls on a cable or linkage (not shown) within the door of the vehicle to release a latch or latch mechanism (also not shown) and, thus, open the door of the vehicle from the outside of the vehicle, as is known in the art.

Handle portion 12 is preferably molded as a one-piece body and preferably molded from a substantially rigid and strong polymeric material, preferably a melt processable material, such as a thermoplastic or a thermoset material. Preferable materials include engineering plastics, such as nylon, and preferably a mineral and/or glass filled nylon, such as Capron 8267, commercially available from Honeywell of Morristown, N.J., or Ultramid B3GM35, commercially available from BASF Aktiengesellschaft of Germany; glass filled Polycarbonate/Polybutylene Terephalate (PC/PBT), such as Xenoy, commercially available from General Electric Plastics—Polymers of Pittsfield, Mass.; non-filled PC/PBT, such as Xenoy NBX224, commercially available from General Electric Plastics—Polymers of Pittsfield, Mass.; and/or a Polyphenylene/Polyamid (PPE/PA) blend, such as Noryl GTX 902, also commercially available from General Electric Plastics—Polymers of Pittsfield, Mass., or any other suitable materials, such as ABS or ASA polymeric engineering plastics or the like. In addition, handle portion 12 may incorporate a soft touch surface, which is molded, for example, to one or more surfaces of handle portion 12 by a thin film molding process, such as described in U.S. patent application Ser. No. 09/597,532, entitled VEHICLE DOOR HANDLE, filed Jun. 20, 2000, now U.S. Pat. No. 6,349,450, which is hereby incorporated by reference herein in its entirety. Furthermore, the door handle may be decorated, such as by painting, or by an in mold film applique, using techniques such as described in U.S. patent application Ser. No. 09/564,665, filed May 1, 2000 by Tun-Jen Chu for CONSOLIDATED EXTERIOR SIDEVIEW MIRROR ASSEMBLY INCORPORATING AN IN-MOLD FILM PROCESS, now U.S. Pat. No. 6,310,738, which is hereby incorporated herein by reference. Optionally, the handle portion may be molded and textured or molded in high gloss, or may be chrome plated (in such an embodiment, it is preferred that the selected handle material be an ABS or polycarbonate ABS material or other like material, which is compatible with the plating of the chrome on the outer surface of the selected handle material) or the like, without affecting the scope of the present invention.

Handle portion 12 may further include a flexible circuit member (not shown) mounted thereto, which couples to the electrical locking control system which locks or unlocks the latching mechanism to permit the door (on which handle assembly 10 is mounted) to be opened, such as disclosed in U.S. provisional application Ser. No. 60/302,099, filed Jun. 30, 2001 by Huizenga for VEHICLE HANDLE ASSEMBLY and in U.S. patent application Ser. No. 10/184,540, filed Jun. 28, 2002 by Huizenga for VEHICLE HANDLE ASSEMBLY, now U.S. Pat. No. 6,854,870, which are hereby incorporated herein by reference. The base portion 13 of door handle assembly 10 may also be preferably integrally molded as a one-piece member from a substantially rigid and strong material, such as a thermoplastic or thermoset material.

Figure 4:
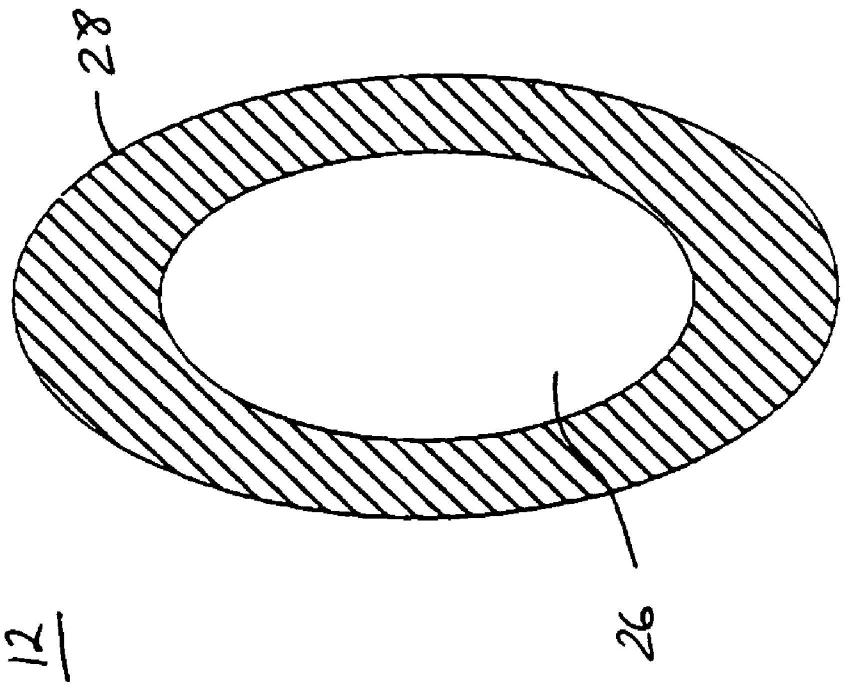
FIG. 4 is a sectional view of a typical hollow strap handle for a vehicle door.

Preferably, the handle assembly components, such as the handle portion and/or the base portion, are manufactured in molding operations that impart such components with lightweight capability, but while still maintaining their structural integrity and performance. Such lightweight molding methods may include an aerated injection molding process, such as the MUCELL™ process described in U.S. patent application Ser. No. 09/679,997, filed Oct. 15, 2000, now U.S. Pat. No. 6,669,267, which is hereby incorporated herein by reference in its entirety. Another benefit from using lightweight molded components is that the process requires a lower tonnage for the molding apparatus, which decreases the cost for production, for example, by increasing cycle times. Optionally, gas injection or blow molding can be used during molding of, for example, a plastic handle or base, so that the weight of the component is reduced. Such a process injects pressurized gas within the mold cavity to blow out excess fill material within the molded handle through an opening in the mold, such that the molded handle is generally hollow with a cavity or air pocket 26 formed within an outer shell or skin portion 28 of the handle (such as shown in FIG. 4). The outer shell or skin portion 28 may be formed in any required or desired shape depending on the particular application of the door handle assembly. The gas injection or blow molding process thus reduces the amount of material required to mold the handle portion and thus reduces the weight of the handle. Also, such a process reduces the wall thickness of the handle portion, which reduces the possibility of sinks or other flaws occurring in the material as it cools after the molding process.

As best seen in FIGS. 5, 9, 10 and 15-17, handle portion 12 includes a leg 30 at one end which extends through the base portion to couple to the cable or linkage, as noted above. Leg 30 of handle portion 12 includes a linkage or cable mounting arm 34 connected thereto. On the other end, handle portion 12 includes an L-shaped pivot member or leg 32, which also extends through the base portion and is pivotally mounted to a mounting flange (not shown) of the base portion about the pivot axis of the handle.

Figure 5:
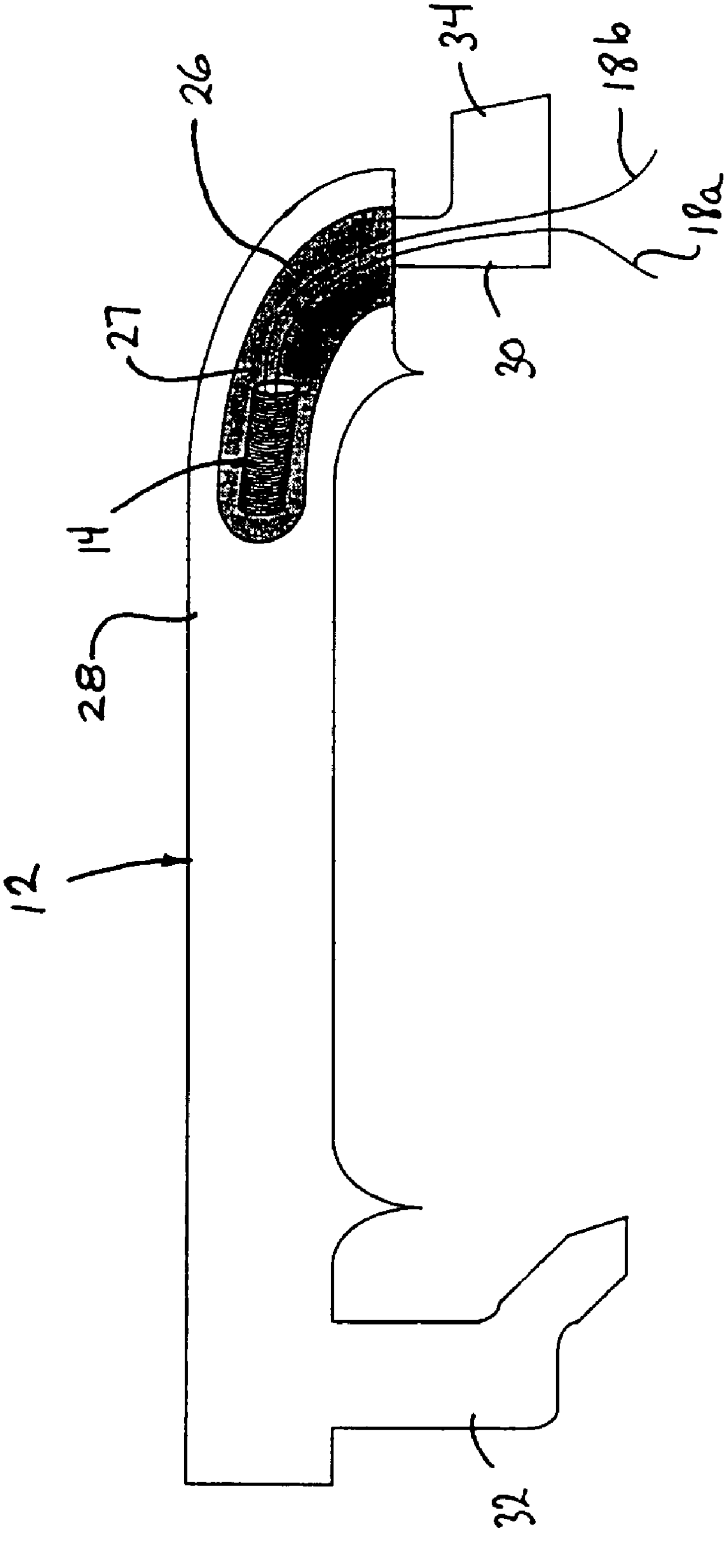
FIG. 5 is a sectional view of a door handle having an antenna sealed within a cavity in the handle in accordance with the present invention.

According to one aspect of the present invention, antenna 14 may be inserted within a cavity (such as formed by a gas injection process, such as discussed above) of an existing handle portion 12, such as within the cavity 26 shown in FIG. 4. Antenna 14 may be positioned within the cavity 26 such that the terminal wirings of the antenna extend through a passageway (not shown) in leg 30 and out of handle portion 12 for connection to corresponding wiring (also not shown) within the vehicle door (as best seen in FIGS. 5, 9, 10 and 12-16). When positioning the antenna within the handle, the antenna may be set to an appropriate or desired orientation to optimize performance of the antenna. For example, the antenna 14 may be angled slightly downward within the handle portion 12 (see, for example, FIG. 6) to direct the receiving range of the antenna downwardly, so as to enhance detection of a signal which may be coming from a person approaching the vehicle, such as from a signaling device being carried in a person's pocket or the like. As shown in FIG. 5, antenna 14 may be sealed in place in its desired location within the cavity formed in door handle 12 with a suitable sealing material 27, such as a hot-melt type material or the like. The antenna may be positioned within a cavity formed in a molded handle or the handle may be molded around an antenna positioned within the mold cavity, and then later sealed within the handle with a suitable sealing material, without affecting the scope of the present invention.

Because the antenna may be inserted into the handle portion as a secondary operation after the handle portion is molded, the antenna may be inserted in a particular handle portion for an application which has the antenna as part of a selected vehicle option. The handle portions 12 for the particular vehicle line or lines thus may be molded as common parts, since the antenna is later inserted into the handle portion as a secondary operation after the handle portion is molded. Therefore, some of the handle portions would have an antenna placed therein, while others would be left hollow, depending on the option selected for the associated vehicle. Also, because the antenna may be inserted into a molded handle portion as a secondary operation, the scrap rate of handles with antennas may be significantly reduced, since any flaws in the handle portion may be detected (and the handle portion may thus be scrapped) before the antenna is inserted into the handle portion.

Figure 6:
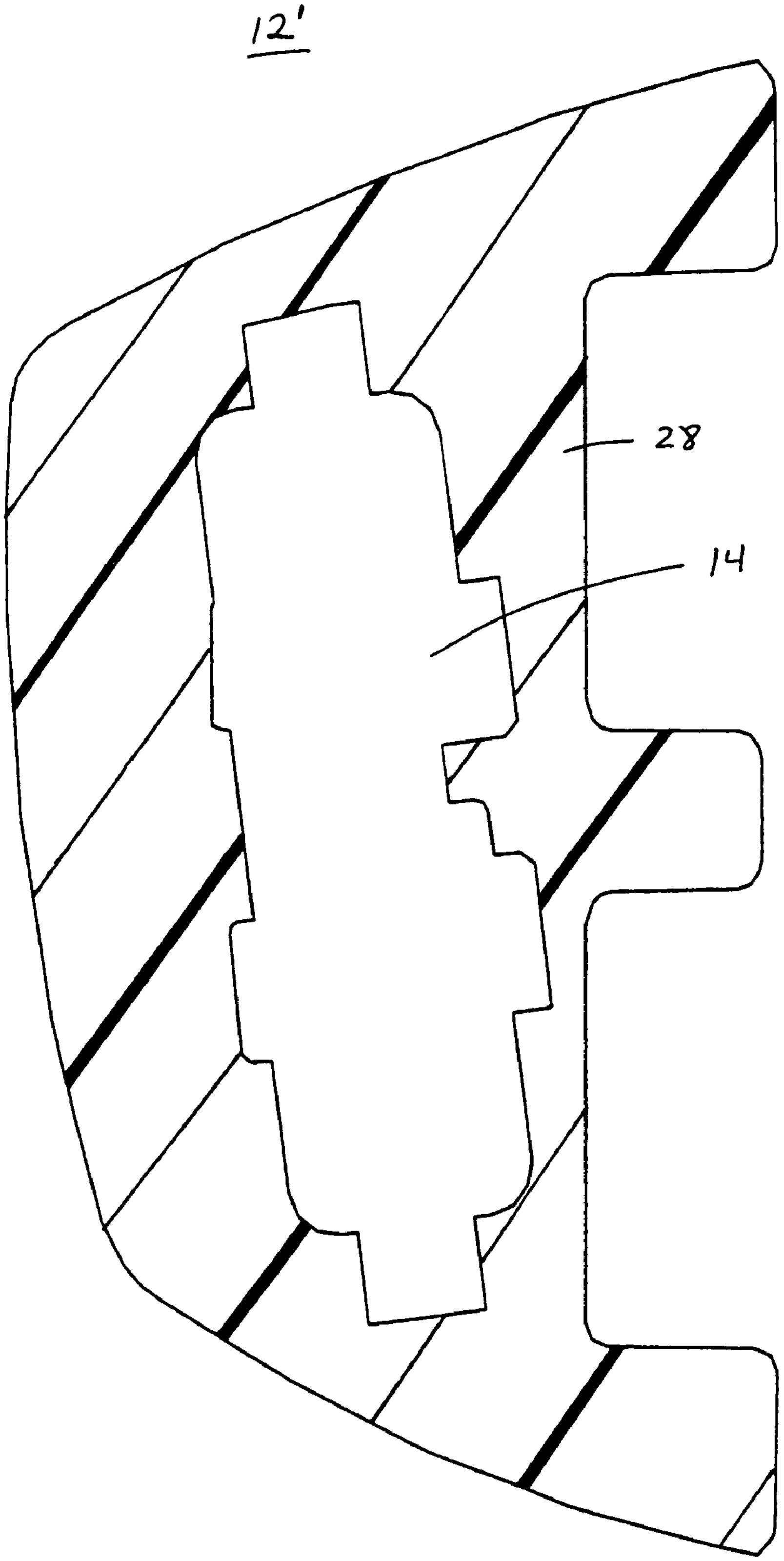
FIG. 6 is a sectional view of a strap handle with an antenna within the handle portion in accordance with the present invention.

Optionally, a handle portion 12' may be molded around an antenna 14, as shown generally in FIG. 6. In such an application, antenna 14 is placed within the handle portion mold, and preferably in a desired orientation within the mold cavity. The antenna is positioned and anchored or retained within the mold during the molding process. The antenna preferably includes a wire connector extending therefrom, which is routed and retained within the mold so that a connecting end of the wire connector extends from the mold and thus extends from the molded handle and antenna assembly. The handle material, such as an engineering plastic or the like, as described above, is then injected or shot into the mold and around the antenna to mold the handle around the antenna. The antenna is thus secured within the handle portion after the handle portion has cooled and hardened.

Figure 7:
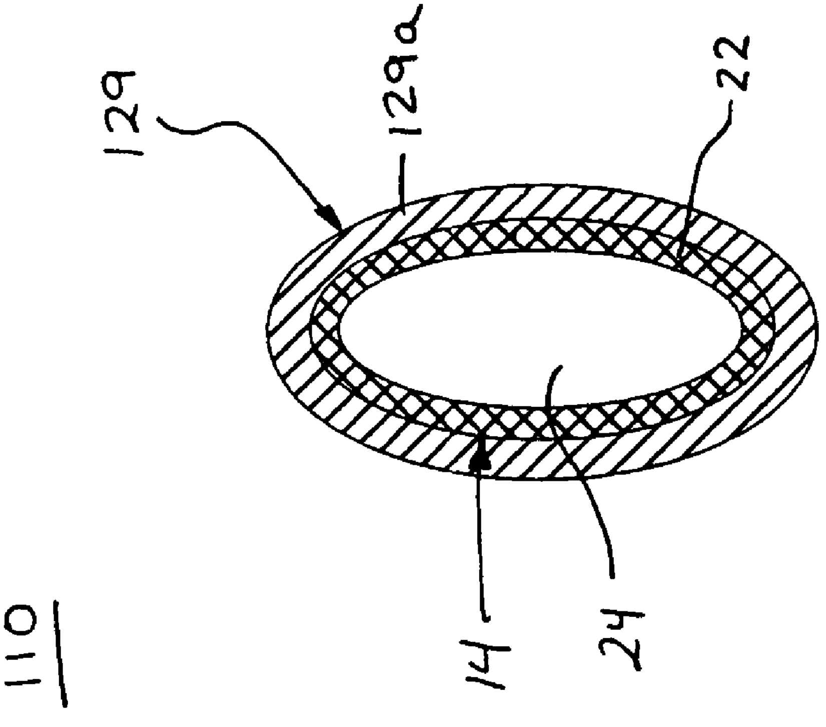
FIG. 7 is a sectional view of an antenna within a molded core or shell portion in accordance with the present invention.
Figure 18:
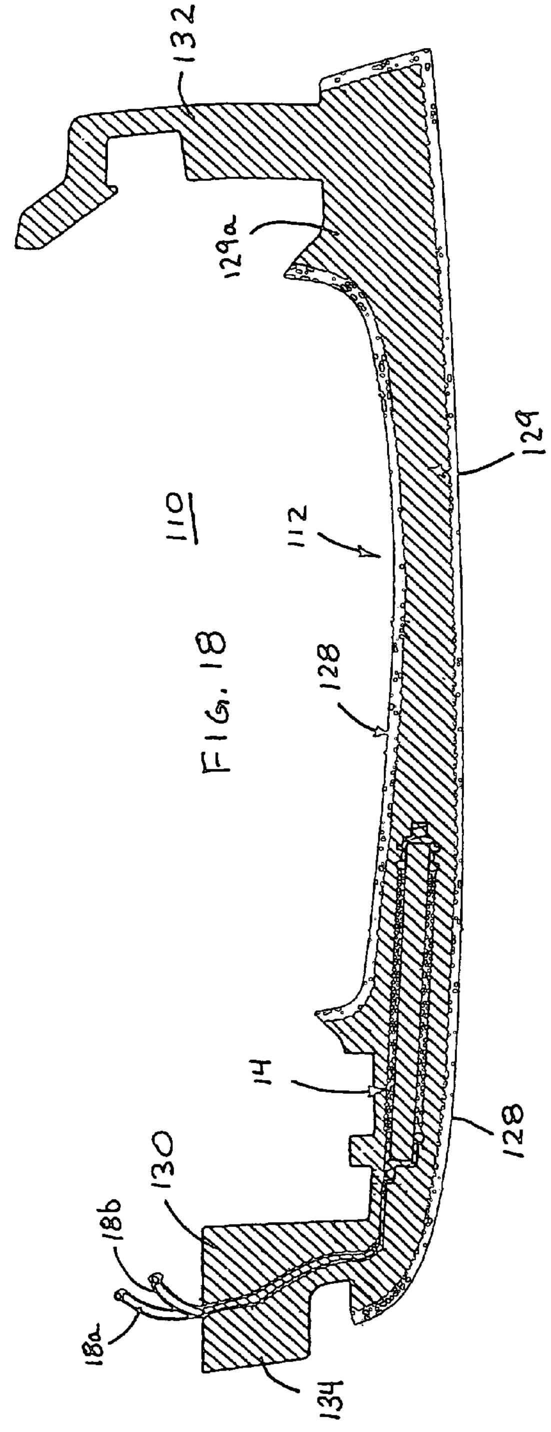
FIG. 18 is a sectional view similar to FIG. 17 of another strap handle and antenna in accordance with the present invention.

Referring now to FIGS. 7-9 and 18, a door handle assembly 110 includes a handle portion 112, which comprises an outer or skin portion 128 (FIGS. 8, 9 and 18) and an inner core portion 129 (FIGS. 7 and 18). Core portion 129 is molded at least partially around an antenna 14, while outer portion 128 of handle portion 112 is in turn molded around core portion 129 and antenna 14. The core portion 129 provides a shell or layer 129*a* which is molded over the antenna 14 to substantially encase antenna 14 and protect antenna 14 during the molding of the outer skin portion 128 of the handle portion 112. Core portion 129 and/or outer skin layer 128 preferably provides a mechanical protection function and/or an environmental sealing function (such as against water ingress, should the handle 112 be exposed to a car wash, rain, road splash and the like) for the encased antenna 14 molded within the core portion.

Preferably, the materials for the core portion 129 and the outer skin portion 128 are selected to be the same material, in order to enhance compatibility of the materials and to ensure that the selected materials have the same shrink rates and other characteristics and properties. A preferred material for both the core portion 129 and the skin portion 128 is a mineral and/or glass filled nylon, such as BASF B3GM35, commercially available from BASF Aktiengesellschaft of Germany, or other similar or otherwise suitable materials, such as those described above with respect to handle portion 12.

Optionally, the material of the shell 129*a* of core portion 129 may be selected to be an economical and safe or benign material for the antenna (such as a material which is molded at a lower temperature and pressure to reduce the possibility of damage to the antenna during the molding process), yet which is strong enough to withstand the higher temperatures and pressures encountered during the molding process of the outer skin portion 128 of handle portion 112, without affecting the scope of the present invention. The core or shell material may also have high flow characteristics during molding when in its molten state, and may be aerated or porous, such as via a gas injection process, such as via the MUCELL™ process described in U.S. patent application Ser. No. 09/679,997, filed Oct. 15, 2000 for EXTERIOR ACCESSORY MODULE FOR VEHICULAR MODULAR DOOR, now U.S. Pat. No. 6,669,267, which is hereby incorporated herein by reference in its entirety, to further reduce the overall weight of the handle portion. The shell of the core portion, which provides both mechanical protection and, preferably, environmental protection for the encapsulated/encased antenna element, may comprise a polymeric material, and preferably an elastomeric material. Suitable core or shell materials may comprise a urethane material, a thermoplastic elastomer, such as Santoprene, a polyvinylchloride (PVC), a thermoplastic olefin (TPO), a nylon material, a reground nylon material, or the like (preferably, aerated or otherwise rendered porous, in order to provide a cushioning function). Preferably, the core or shell material is selected to be compatible with the outer skin portion material of the outer skin 128, to avoid potential concerns when molding the outer skin portion over the core portion. For example, if the outer skin portion is selected to be Capron or other filled nylon material, the core material may be selected to be reground Capron or other filled nylon material, which would be highly compatible with the outer skin material and have sufficient structural strength.

Optionally, it is envisioned that the material for the outer skin portion may be selected to be compatible for chrome plating of the handle portion after the handle portion has been molded. For example, the material for the outer skin portion may be selected to be an ABS or a polycarbonate ABS material or the like, while the inner core portion may be a glass filled nylon or other structural material or the like (optionally, the inner core portion may still be the same material or any other suitable and compatible material). A chrome layer or surface may then be plated over the ABS skin portion, since such materials are suitable for such plating processes. Optionally, other materials may be utilized, and the outer skin portion may be painted or textured as desired, without affecting the scope of the present invention. The outer skin may also or otherwise be molded in high gloss, without affecting the scope of the present invention. In such an embodiment, the outer skin material is preferably a non-filled material. Optionally, the outer skin portion may include a soft touch material molded thereon, such as disclosed in U.S. patent application Ser. No. 09/597,532, filed Jun. 20, 2000 for VEHICLE DOOR HANDLE, now U.S. Pat. No. 6,349,450, which is hereby incorporated herein by reference, or other paint or molding material, without affecting the scope of the present invention.

During manufacture of the handle portion 112, antenna 14 is positioned in a first mold cavity for molding the core portion 129 around the antenna. The antenna 14 may be anchored, retained or held in place in the mold cavity via pins or inserts in the mold cavity extending from one or more of the walls of the mold cavity, or via pins or legs extending from one or more portions of antenna 14 and contacting one or more surfaces of the mold walls, or via any other means for anchoring or retaining the antenna in place in the mold during the molding process, such as, for example, via gravity holding the antenna at or against a lower wall of the mold cavity, without affecting the scope of the present invention. Preferably, antenna 14 includes wiring 18*a*, 18*b* extending therefrom. The wiring 18*a*, 18*b* of antenna 14 may be positioned in the mold cavity so that the core portion is at least partially molded around the wiring. The wiring 18*a*, 18*b* is preferably routed and/or retained or secured in the mold in such a manner to avoid damaging the wires or tearing or otherwise disconnecting the wires from the antenna 14. The molding or core portion then at least substantially encapsulates and protects the antenna 14 and the wires 18*a*, 18*b* extending therefrom. The ends of the wiring then extend from the core portion 129, such as from an end of the mounting leg 130, as shown in FIG. 18.

Preferably, the antenna 14 is positioned in the core portion mold cavity at, near or toward one end of the mold for the handle portion 112, while the gate for injecting the material into the mold cavity is positioned at, near or toward an opposite end of the mold (and thus of the molded handle portion or core portion), in order to minimize the amount of material which will flow over the antenna during the molding process. The mold cavity for molding the core portion 129 need not provide a highly smooth, polished surface for molding the core portion, since the core portion does not require the smooth, class A type finish. As can be seen in FIG. 18, the areas where such a smooth, class A type finish is desired (i.e., the outer, visible region of the strap handle and maybe the inner grasping region of the handle) are covered by the outer skin portion 128. Also, any sinks, blemishes, or holes (such as holes formed from the pins or inserts which may hold the antenna in place during the mold process) or the like are not a concern with the core portion 129, since these will be filled in by the thin, outer skin portion 128 which is molded over the core portion during the second mold process.

After the core portion 129 is formed around the antenna 14 (which may have its terminal ends extending from the core portion), the outer skin portion 128 is molded over the core portion 129 to finish the handle portion 112. Any higher temperature and pressure which may be associated with certain selected materials for the outer portion then does not damage or otherwise detrimentally affect the antenna within the molded core portion. The outer skin portion provides a thin layer over the desired areas of the inner core portion. The mold cavity for the second mold process preferably provides a highly smooth and polished surface in order to result in a highly smooth, finished, class A type finish to the outer skin layer on the handle portion. The thin outer layer (such as approximately two millimeters thick, and preferably having a thickness in the range of about 0.1 mm to about 8 mm) results in minimal if any blemishes or sinks in the outer layer, and thus provides a highly smooth, class A type finish to the handle portion. Any sinks or blemishes in the outer surface of the core portion may be substantially filled in by the thin outer skin layer.

Figure 8:
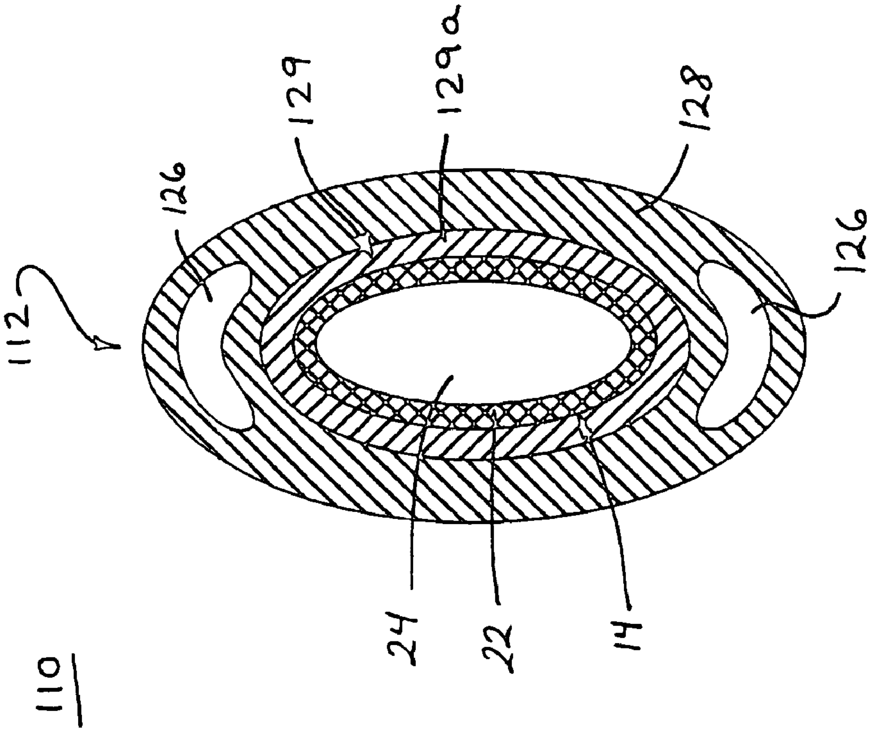
FIG. 8 is a sectional view of the core portion of FIG. 7 within an over-molded outer skin portion of a door handle in accordance with the present invention.

Because the core portion 129 occupies and, preferably, substantially fills in, the interior portion of the handle, the outer skin material may be molded in a relatively thin layer around the core portion, in order to reduce the possibility of sinks or other blemishes or problems which are associated with molding a part having a substantial wall thickness. As shown in FIG. 8, the outer skin portion 128 may also be molded over and around core portion 129 such that there are cavities or pockets 126 within the handle portion 112, such as via a gas injection process of the type discussed above, in order to further reduce the wall thickness of the outer skin material. This not only may provide for a handle portion of improved quality, but also may utilize less of the outer skin material, which may reduce the possibility of sinks or blemishes in the outer skin, and which may reduce the costs associated with molding the handle, since the selected outer skin material may be more expensive than the selected inner core material.

Figure 9:
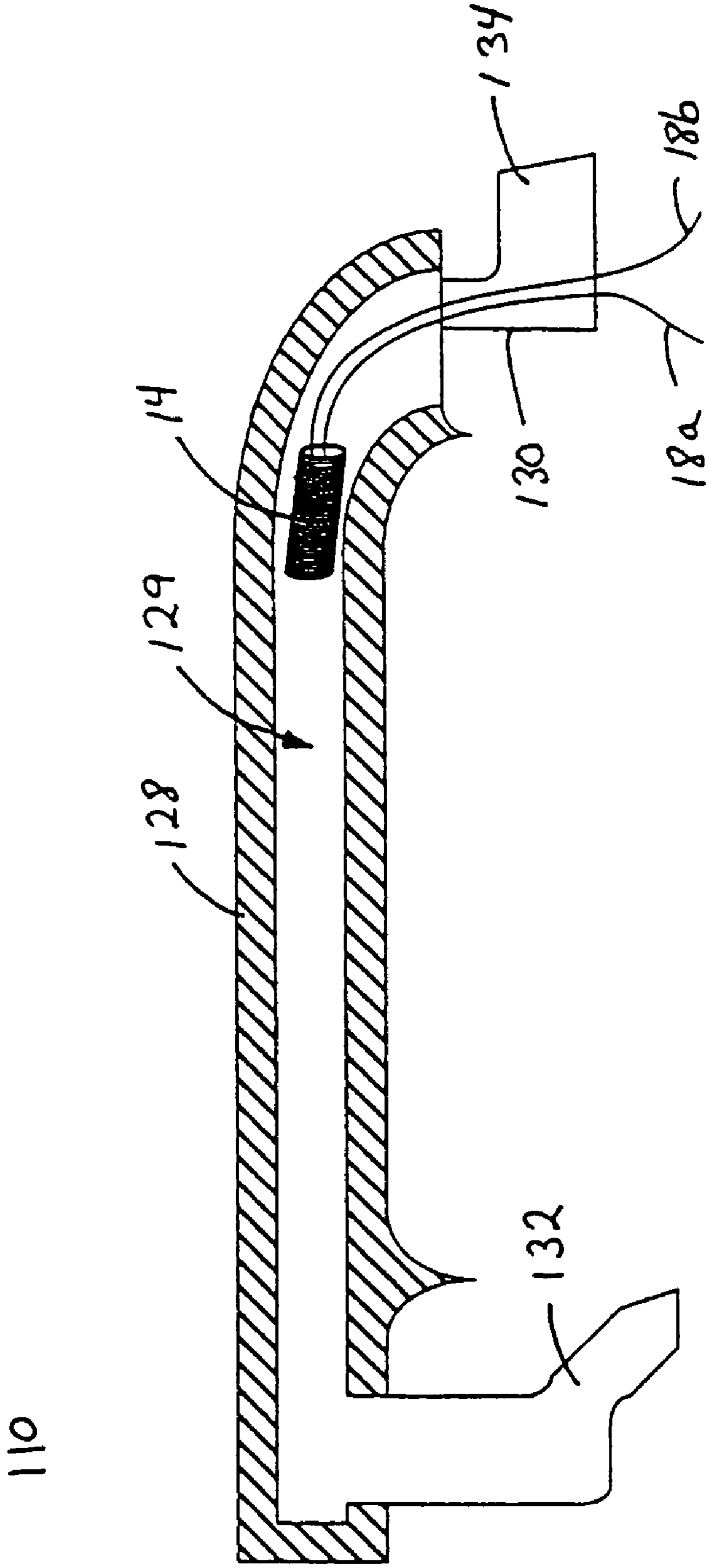
FIG. 9 is another sectional view of a door handle having an antenna and core portion within an outer skin portion in accordance with the present invention.
Figure 10:
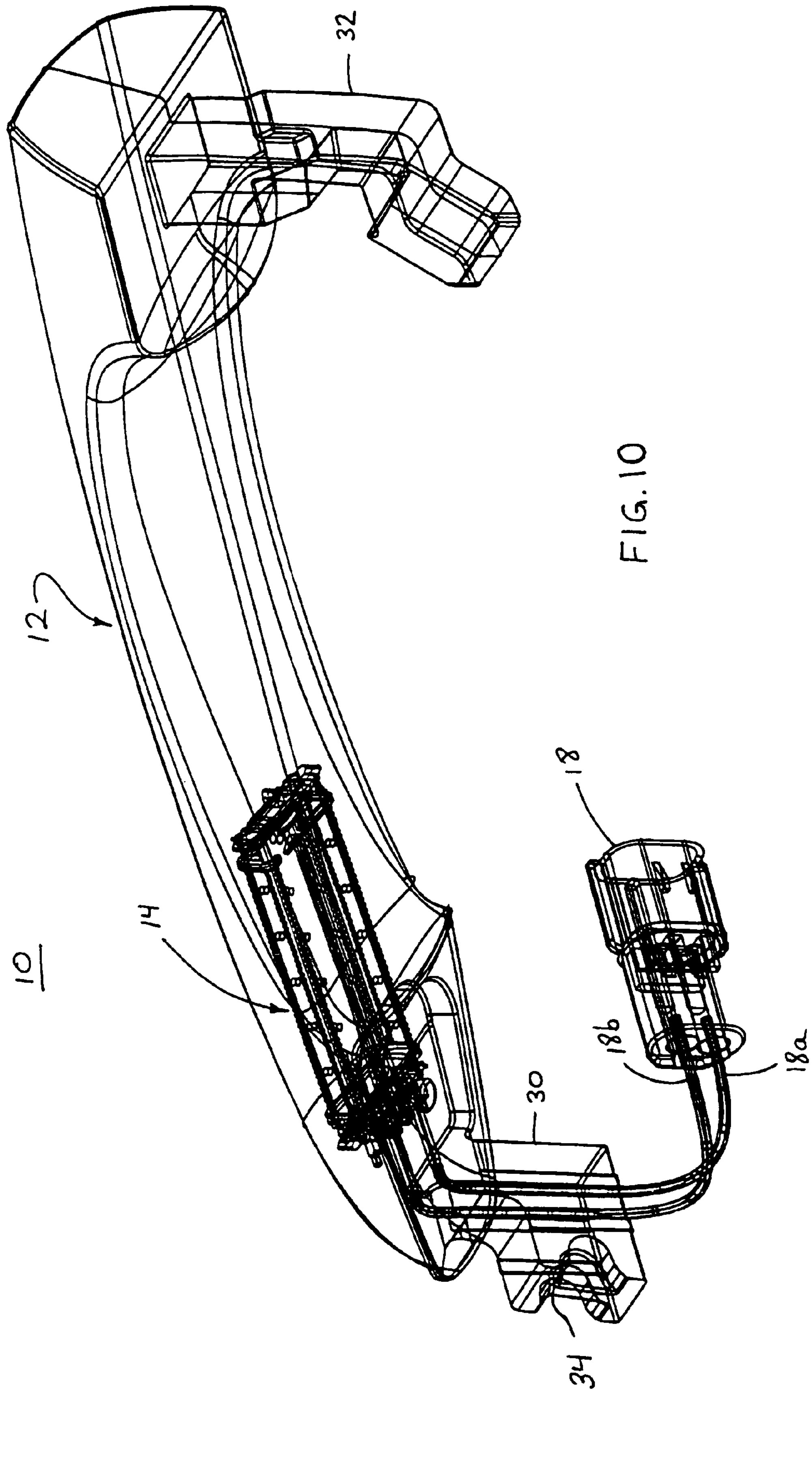
FIG. 10 is a perspective view of a strap handle and antenna in accordance with the present invention.
Figure 13:
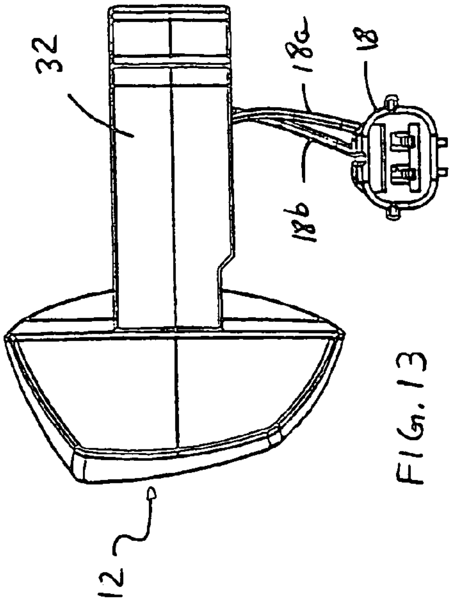
FIG. 13 is an end elevation of the strap handle taken from the line XIII-XIII in FIG. 11.
Figure 12:
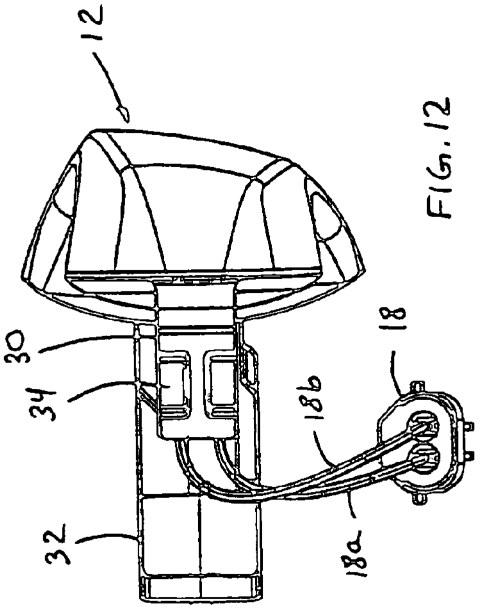
FIG. 12 is an end elevation of the strap handle taken from the line XII-XII in FIG. 11.
Figure 11:
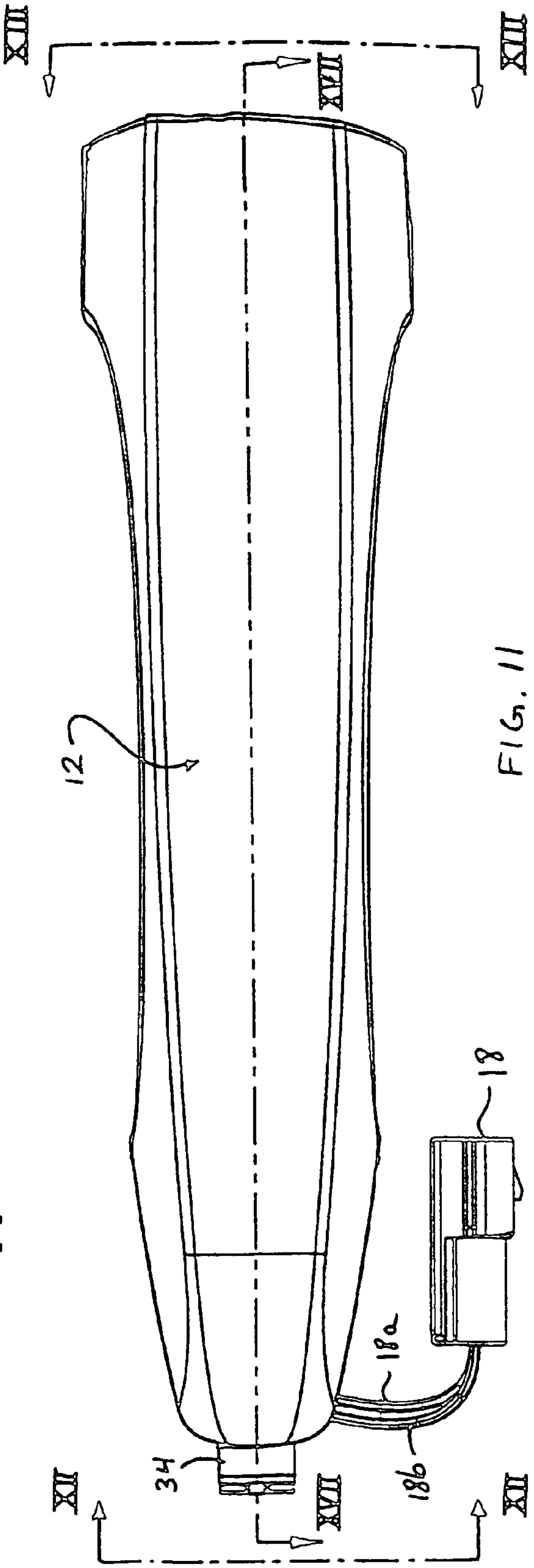
FIG. 11 is a side elevation of the strap handle of FIG. 10, as viewed from outside of the vehicle.
Figure 15:
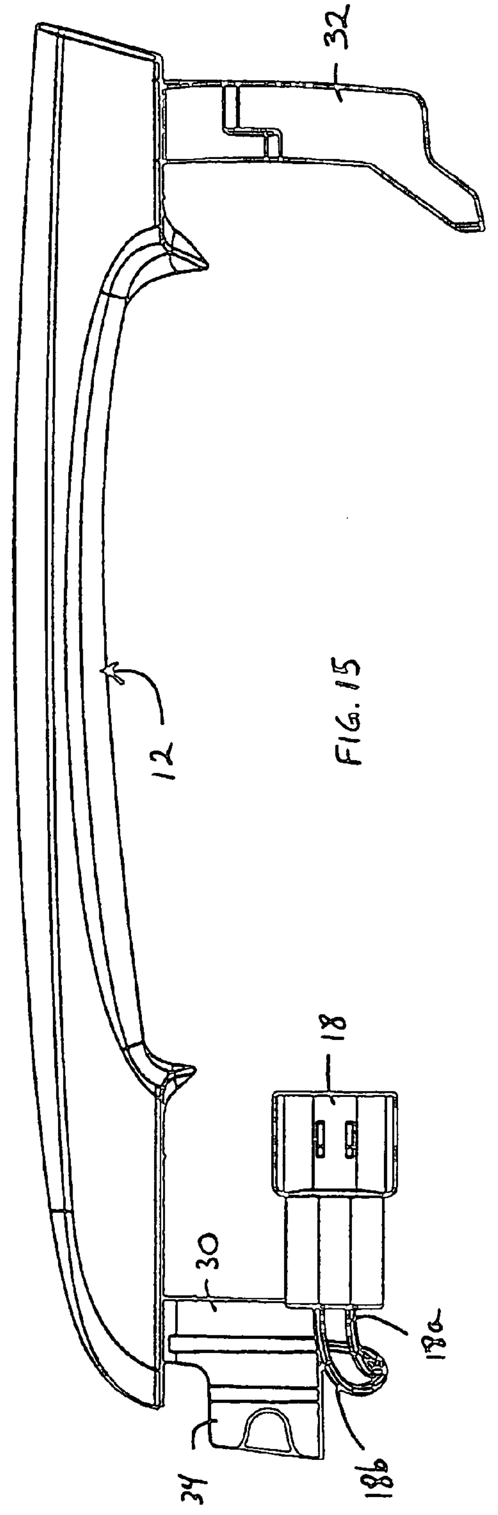
FIG. 15 is a top plan view of the strap handle of FIGS. 10-14.
Figure 14:
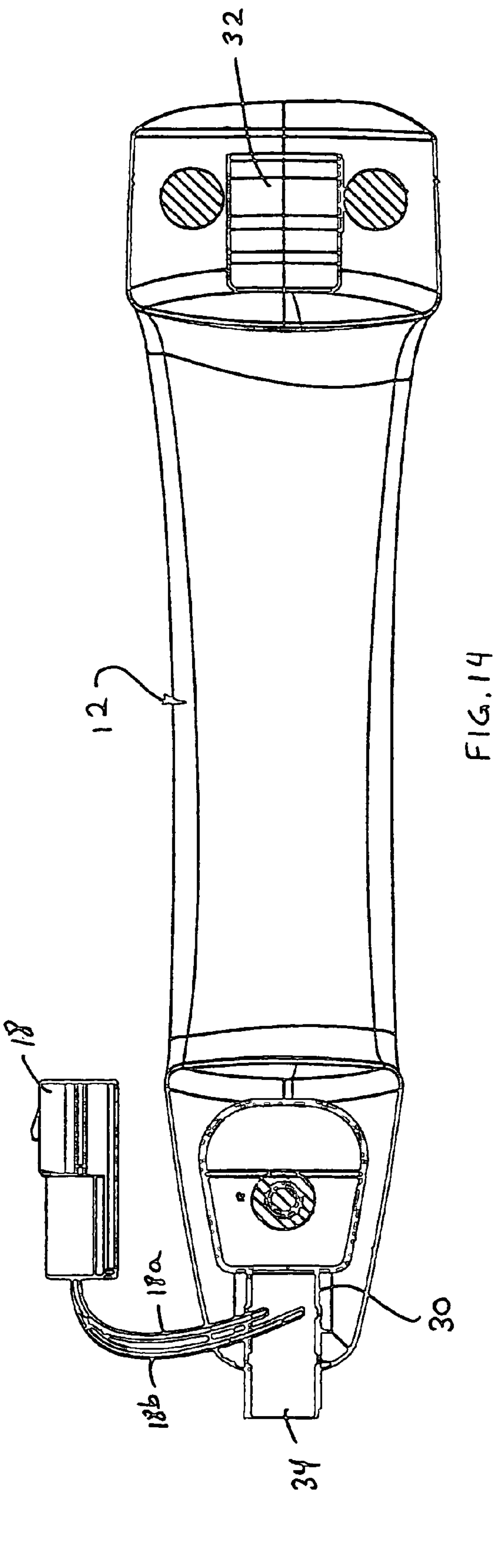
FIG. 14 is a side elevation of the strap handle of FIGS. 10-13, as viewed from inside the vehicle door.
Figure 17:
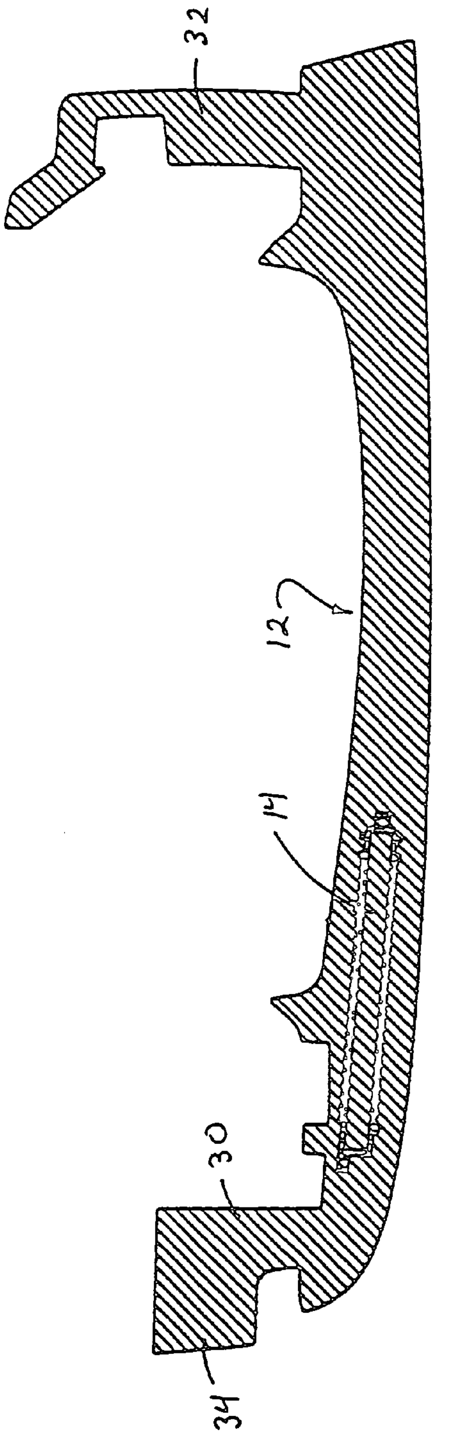
FIG. 17 is a sectional view of the strap handle taken along the line XVII-XVII in FIG. 11.
Figure 16:
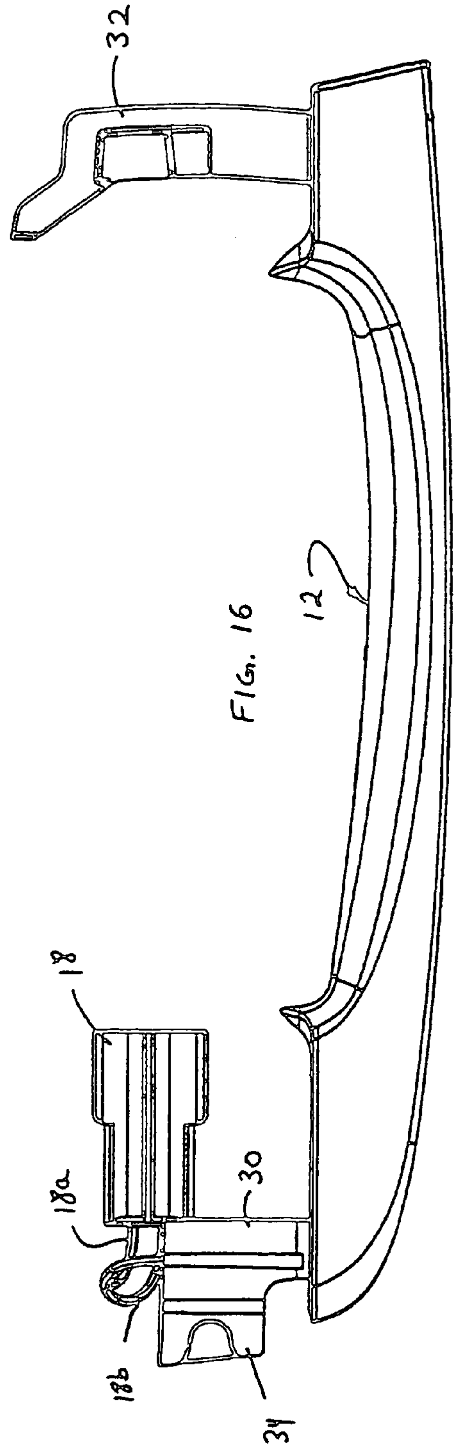
FIG. 16 is a bottom plan view of the strap handle of FIGS. 10-15.

As shown in FIGS. 9 and 18, core portion 129 may comprise an inner portion of substantially the entire handle portion 112, and may further include the mounting legs or members 130, 132 extending from its ends. The outer skin portion 128 is then molded over and around the inner handle portion or core portion between the leg 130 (including a cable mounting arm 134) and pivot leg 132, such that substantially the entire portion of the handle that is exposed for viewing and touching is over-molded with the outer skin material. The leg portions may be molded as part of the core portion because they do not require the high cosmetic quality, Class A finish provided by the outer skin material. Therefore, the handle portion 112 may be manufactured using a less expensive core material and/or a less expensive mold or molding process in all areas where the smooth polished mold cavity and/or a higher quality, more expensive material is not required, which results in a lower cost handle assembly. The antenna terminal ends 18*a*, 18*b* may extend through leg 130 and further into the door of the vehicle, when door assembly 110 is mounted to the door of the vehicle.

Optionally, handle portion 112 may be manufactured via an integral co-injection molding operation, where the core portion 129 and outer skin portion 128 are molded in a single molding machine. More particularly, the antenna 14 may be positioned within a cavity of the molding machine and the core material may be injected into the mold to form the core portion 129 around the antenna. The antenna is positioned within the mold cavity such that its wire terminals extend through the wall of the mold so they will extend from the finished part for later connection with the corresponding wiring within the vehicle door. After the core portion is molded, the mold cavity is adjusted, such as via moving pins and mold walls, to form a second cavity which defines the shape of the handle portion around the core portion 129. The outer skin or outer shell or handle material is then injected into the adjusted second cavity, whereby the core portion 129 functions as an inner wall of the adjusted mold cavity. Therefore, the handle portion may be molded by a two shot or two injection process within a single molding machine.

Alternately, it is envisioned that the handle portion 112 may be molded via two distinct molding operations, without affecting the scope of the present invention. In such a process, the antenna may be placed in a first mold cavity, where the core material is molded around the antenna 14, such as, for example, by a low pressure and low temperature molding process (such as RIM urethane molding), as discussed above. After the core portion cools, it may be removed from the first mold as a stand-alone, encased, molded antenna module, and placed in a separate, distinct mold for molding the outer skin or handle portion around at least a portion of the core portion. The core portion is positioned within the second mold cavity such that the terminal wiring (if applicable) of the antenna extends through the wall of the second mold so it will also extend from the finished door handle portion. The outer skin material is then injected into the second mold cavity (such as, for example, at a higher temperature and pressure) to mold the finished, high quality shell or skin of the handle portion around the core portion.

Although the handle is shown and described as a strap type handle, it is envisioned that the handle may be any other type of handle, such as a paddle type handle or the like, such as disclosed in U.S. patent application Ser. No. 09/597,532, filed Jun. 20, 2000 for VEHICLE DOOR HANDLE, now U.S. Pat. No. 6,349,450, which is hereby incorporated herein by reference, without affecting the scope of the present invention.

Figure 19:
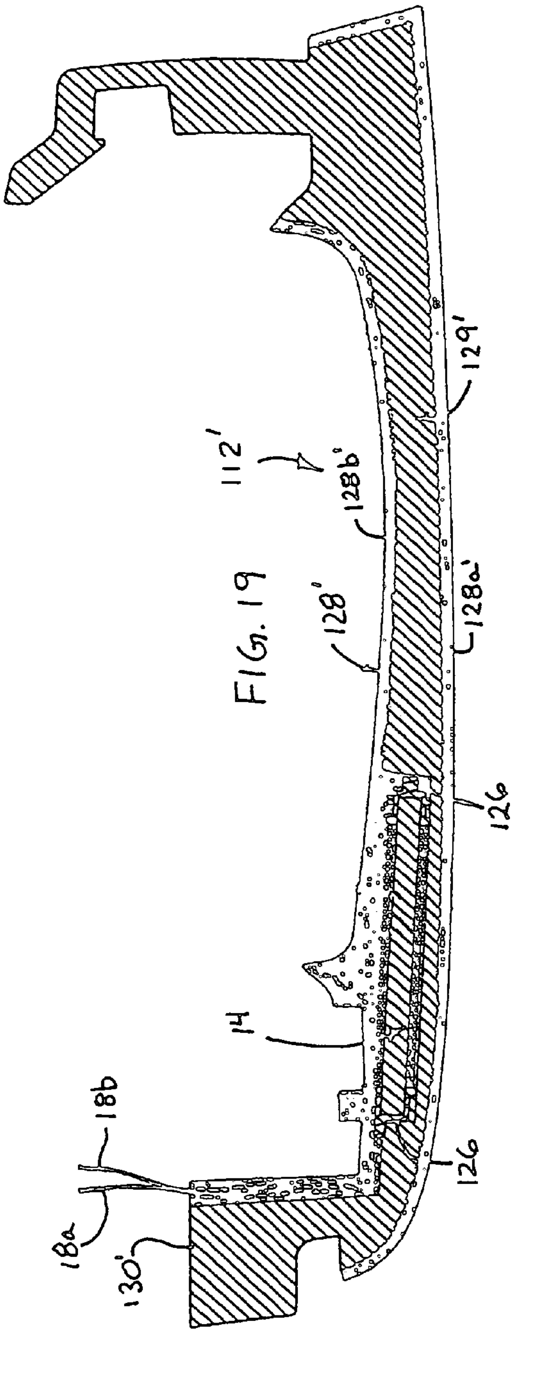
FIG. 19 is a sectional view similar to FIGS. 17 and 18 of another strap handle and antenna in accordance with the present invention.

Referring now to FIG. 19, a handle portion 112' of a door handle assembly comprises an outer or skin portion 128' and an inner core portion 129'. Core portion 129' includes a pocket or cavity 126 formed therein for receiving an antenna 14, and in turn is molded within outer portion 128' of handle portion 112' in a similar manner as discussed above with respect to handle portion 112. The core portion 129' provides an inner structural shell in which the antenna 14 is placed so as to substantially encase antenna 14 in pocket 126 to protect antenna 14 during the molding of the outer skin portion 128' of the handle portion 112'. Preferably, the material for the core portion 129' and the outer skin portion 128' are selected to be the same material, in order to enhance compatibility of the materials and to ensure that the materials have the same shrink rates and other characteristics and properties. A preferred material for both the core portion 129' and the skin portion 128' is a mineral and/or glass filled nylon, such as BASF B3GM35, commercially available from BASF Aktiengesellschaft of Germany, or other similar or otherwise suitable materials, such as those described above with respect to handle portion 12.

As can be seen in FIG. 19, pocket 126 is formed in core portion 129' and is formed to receive antenna 14 therein, such that antenna 14 is substantially encased within the pocket. The terminals or wires 18*a*, 18*b* of antenna 14 are placed along the mounting arm 130' of the core portion 129' when the core portion 129' and antenna 14 are placed in the second mold for molding the outer skin portion 128' over the core portion 129'. Similar to the anchoring of the antenna within the mold cavity of the core portion 129, discussed above, the antenna 14 is preferably anchored or positioned in the cavity of core portion 129' and wires 18*a*, 18*b* are routed and/or anchored or retained within the cavity of the core portion and preferably along the leg 130', such that the antenna and wires remain in position during the overmolding process for the outer skin portion. The connectors or ends of the wires then extend from the molded core portion.

The outer skin portion 128' is molded over the outer surface of the core portion and over the antenna 14 in pocket 126 and preferably further along mounting arm 130' to retain the antenna 14 and the terminals 18*a*, 18*b* within the outer portion 128' and/or the inner core portion 129'. When positioned within pocket 126, antenna 14 may be retained in the pocket during the molding process via pins or inserts in the second mold for the outer skin portion or via gravity or any other means for generally retaining the antenna within the pocket, such as frictionally retaining the antenna in the pocket, during the second molding process, without affecting the scope of the present invention.

As discussed above with respect to handle portion 112, the inner core portion 129' may be molded during a first molding process, which may not provide a highly smooth finish or surface to the core portion. The antenna 14 is placed into the pocket 126 after molding and cooling of the inner core portion 129'. This may reduce the amount of scrap or waste or scrap rate of the antennae in the handles, since any inner core portions which are scrapped due to flaws in the core portion are scrapped before the antenna is placed therewithin. Therefore, the handle portion 112' may provide a reduced scrap rate of antennae and thus may result in a lower cost handle assembly. After the antenna is positioned within the pocket 126 of core portion 129', the outer skin portion 128' is over-molded in a thin layer over the core portion 129' and over the antenna 14 in the pocket 126 in a manner which provides a thin, highly smooth, class A type finish to the handle portion. If inserts or the like are implemented to retain the antenna in the pocket, the inserts may be provided near the mounting arm 130' and remote from the visible outer surface 128*a*' and/or the inner grasping surface 128*b*' of the handle portion, so as to not adversely affect the smooth, class A type finish of the outer portion 128'.

Figure 20:
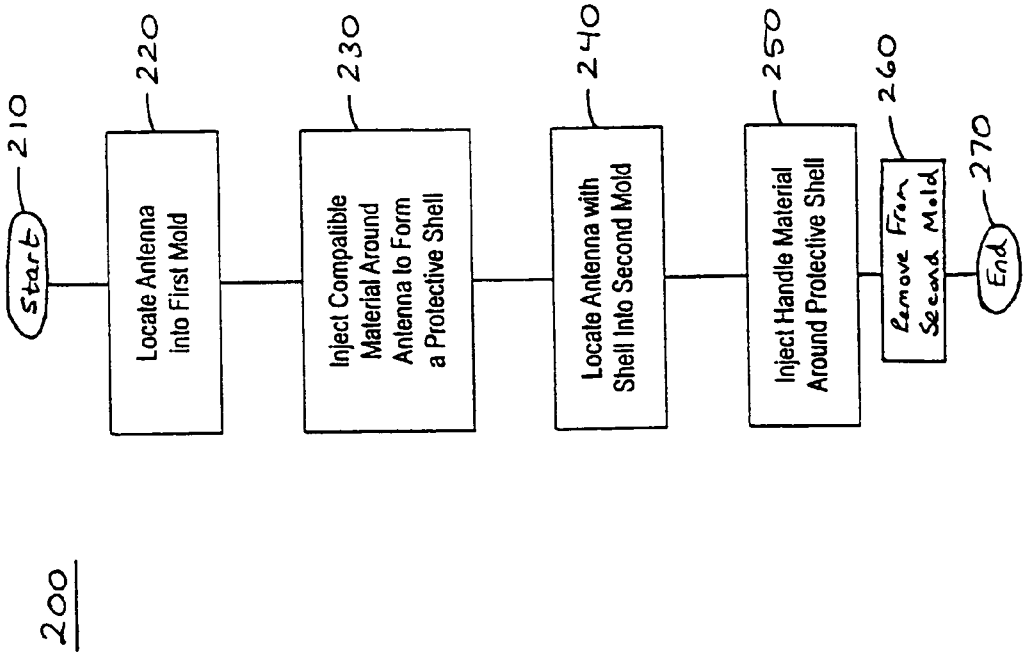
FIG. 20 is a flow chart of a process for manufacturing the door handle assembly of the present invention.

Referring now to FIG. 20, a process 200 for molding a handle portion around an antenna starts at 210. The antenna is located in a desired orientation and position within a first mold or core mold at 220. Preferably, the antenna is positioned and anchored or retained within the first mold cavity, while the wires of the antenna may be routed and retained within the mold cavity so that the ends of the connectors extend from the mold. The first mold material, which may be selected to be economical and compatible with the selected outer skin material, is then injected into the mold cavity of the core mold and at least partially around the antenna to form a protective inner shell or core around the antenna at 230. The core portion, which includes the antenna and the protective shell or under-mold, is then located in a desired orientation and position within a second mold or outer shell or skin mold at 240. The second mold material, which is preferably selected to provide a durable, high quality, finished outer shell or skin to the handle portion, is then injected into the second mold and at least partially around the protective core portion and antenna at 250. The handle portion is removed from the second mold at 260 and process 200 ends at 270.

Although shown and described as positioning the antenna within the handle portion of a vehicle door handle assembly, clearly the scope of the present invention includes positioning (such as by molding) the antenna elsewhere within the door handle assembly, such as within the chassis or base portion of the door handle assembly.

Optionally, the vehicle door handle assembly of the present invention may also or otherwise include a sensor or sensors, such as an imaging array sensor (such as of the type disclosed in U.S. Pat. Nos. 5,670,935 and 5,550,677, which are hereby incorporated herein by reference), a camera, a Doppler radar sensor, a side object detection and/or monitoring sensor, such as an ultrasonic sensor or infrared sensor or the like (such as, for example, the type disclosed in U.S. patent application Ser. No. 09/793,002, filed Feb. 26, 2001 by Schofield et al. for VIDEO MIRROR SYSTEMS INCORPORATING AN ACCESSORY MODULE, now U.S. Pat. No. 6,690,268, which is hereby incorporated herein by reference), or other sensing or detecting means. The sensing means may be positioned, such as by molding as discussed above, within the handle portion and/or within the base or chassis portion of the door handle assembly and may sense or detect objects exterior of the vehicle. The sensing means may then be operable to communicate a signal to a display system, alert or warning system, security system, or other receiving system which receives such a signal and functions in response to the signal. The signal may be communicated via any known means, such as via a wire connection, such as cables, wires, fiber optic cables or the like, or wirelessly, such as via a radio frequency (RF) signal, an infrared signal, or other wireless signaling means.

Therefore, the present invention provides a vehicle door handle assembly which includes an antenna within a handle portion or a base or chassis portion of the vehicle door handle assembly. The antenna may be positioned within an existing cavity of the handle portion or the handle portion may be molded at least partially around the antenna. Preferably, an inner, core portion of the handle portion is molded at least partially around the antenna, and an outer skin portion of the handle portion is then molded or over-molded at least partially around the core portion. The core portion may comprise an inexpensive and lightweight material and substantially fills in or occupies the inner region of the handle portion. The outer skin portion of the handle may then be molded in a thin layer, such as approximately 1-3 mm thick, and, more preferably, approximately 2 to 2.5 mm thick, around the core portion. By molding the outer skin portion of the handle portion in a thin layer, the present invention facilitates production of a high quality surface for the handle portion, and reduces the possibility of sinks occurring in the outer skin material as it cools. The present invention also provides for a lower cost handle assembly, since less of the skin material, which may be expensive, is required for the outer skin portion, while still providing a strong and durable door handle assembly with a high quality, Class A surface (suitable for high yield decorative painting of the surface in a paint operation separate from the molding operations that form the class A surface).

While several forms of the invention have been shown and described, other forms will be apparent to those skilled in the art. Therefore, it will be understood that the embodiments shown in the drawings and described above are merely for illustrative purposes, and are not intended to limit the scope of the invention. Changes and modifications in the specifically described embodiments can be carried out without departing from the principles of the present invention, which is intended to be limited by the scope of the appended claims as interpreted according to the principles of patent law.

The embodiments of the invention in which an exclusive property or privilege is claimed are defined as follows:

1. A method for molding a door handle portion of a vehicle door handle comprising:

providing a handle mold for a unitary door handle portion;
providing a mold cavity of a core mold; and
positioning an antenna in said mold cavity of said core mold;
providing core material within a mold cavity of a core mold to form a core portion, wherein providing core material comprises providing core material within said mold cavity of said core mold at least partially around said antenna to form a unitary core portion and antenna assembly;
positioning said core portion and said antenna within a mold cavity of said handle mold;
providing handle material within said mold cavity and at least partially around said antenna;
molding said provided handle material to form said unitary door handle portion at least partially around said antenna; and
removing said unitary door handle portion from said handle mold.

2. The method of claim 1, wherein positioning said antenna in said mold cavity of said core portion is prior to providing handle material to said mold cavity of said handle mold.

3. The method of claim 1 including providing an electrical connector to said antenna and positioning said electrical connector within said mold cavity of said core mold such that an end of said electrical connector extends from said core portion after said core portion is removed from said core mold.

4. The method of claim 1, wherein providing core material into said mold cavity comprises injecting core material into said mold cavity via a gate positioned at or near one end of said core mold, said antenna being positioned at or near the other end of said core mold.

5. The method of claim 1, wherein said core portion comprises a core handle portion and at least one mounting portion integrally molded with said core handle portion.

6. The method of claim 5, wherein providing handle material comprises providing handle material substantially around said core handle portion of said core portion.

7. The method of claim 6, wherein said handle material provides a class A type finish to said unitary door handle portion, and wherein said class A type finish comprises a substantially smooth outer surface of said unitary door handle portion.

8. The method of claim 1, wherein said core material and said handle material comprise substantially the same material.

9. The method of claim 8, wherein said core material and said handle material comprise one of a mineral filled nylon material and a glass filled nylon material.

10. The method of claim 1, wherein said core material comprises a different material from said handle material.

11. The method of claim 1, wherein said core material comprises one of a urethane material, a thermoplastic elastomer, a polyvinylchloride (PVC), a thermoplastic olefin (TPO), a nylon material and a reground nylon material.

12. The method of claim 11, wherein said handle material comprises one of a thermoplastic material and a thermoset material.

13. The method of claim 1, wherein providing core material comprises providing porous core material.

14. The method of claim 1, wherein said handle material comprises a substantially rigid and strong polymeric material.

15. The method of claim 1, wherein said handle material comprises one of a thermoplastic material and a thermoset material.

16. The method of claim 1, wherein providing handle material comprises injecting handle material into said mold cavity.

17. The method of claim 16, wherein injecting handle material into said mold cavity comprises injecting handle material into said mold cavity via a gate positioned at or near one end of said handle mold, said antenna being positioned at or near the other end of said handle mold.

18. The method of claim 1 including providing an electrical connector to said antenna and positioning said electrical connector within said mold cavity such that an end of said electrical connector extends from said unitary door handle portion after said unitary door handle portion is removed from said mold.

19. A method for molding a door handle portion of a vehicle door handle comprising:

providing a handle mold for a door handle portion;

positioning an antenna within a mold cavity of said handle mold;

providing handle material within said mold cavity and at least partially around said antenna to form said door handle portion;

wherein prior to providing handle material within said mold cavity, said method comprises providing core material within a mold cavity of a core mold to form a core portion and positioning said core portion and said antenna within said mold cavity of said handle mold, and wherein said core mold cavity and said handle mold cavity are within a single mold, said core portion and said handle portion being molded via a two shot molding process; and removing said door handle portion and antenna from said handle mold.

* * * * *